United States Patent [19]

Amano

[11] Patent Number: 4,971,559
[45] Date of Patent: Nov. 20, 1990

[54] GLOBE HAVING MEANS FOR INDICATING A DAY AND NIGHT BOUNDARY

[76] Inventor: Takeshi Amano, 191-23 Oaza Mitsuzuka, Saku-shi, Nagano-ken, Japan

[21] Appl. No.: 407,220

[22] Filed: Sep. 14, 1989

[30] Foreign Application Priority Data

May 26, 1989 [JP] Japan .................. 1-133826

[51] Int. Cl.⁵ .............................. G09B 27/00
[52] U.S. Cl. .................... 434/143; 434/131; 434/149
[58] Field of Search ............... 434/136, 149, 131, 142, 434/143, 146, 284, 285, 286, 287, 289, 290, 291

[56] References Cited

U.S. PATENT DOCUMENTS

| | | | |
|---|---|---|---|
| 29,755 | 8/1860 | Barnard | 434/143 X |
| 253,508 | 2/1882 | Cheney | 434/131 |
| 1,520,047 | 9/1924 | Browr | 434/136 |
| 2,102,413 | 4/1934 | Hall | 434/143 |
| 3,133,359 | 6/1961 | Kuriyama | 434/131 |

FOREIGN PATENT DOCUMENTS 1262118 4/1961 France ................. 434/131

OTHER PUBLICATIONS

Nystrom '65, Catalog #C-65, p. 41, 1965.

*Primary Examiner*—Richard J. Apley
*Assistant Examiner*—Rachel M. Healey
*Attorney, Agent, or Firm*—Jeffers, Hoffman & Niewyk

[57] ABSTRACT

A globe, comprising: a stationary base; a day and night boundary ring mounted on the stationary base; an arm supported at its base end by the day and night boundary ring so as to be rotatable around a first axial line; and a spherical globe main body rotatably supported by a free end of the arm so as to be rotatable around its earth's axis; the first axial line defining the ecliptic angle with respect to a vertical line. According to this globe, the distribution of the regions of day and night in any time of the day and in any time of the year can be readily demonstrated by means of the day and night boundary ring simply by turning the globe body around the earth's axis and the first axial line, respectively, without using any complicated structure.

6 Claims, 6 Drawing Sheets

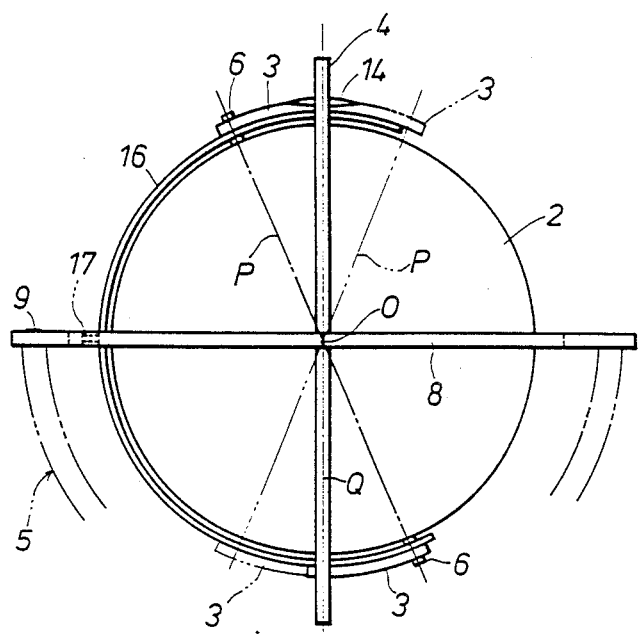
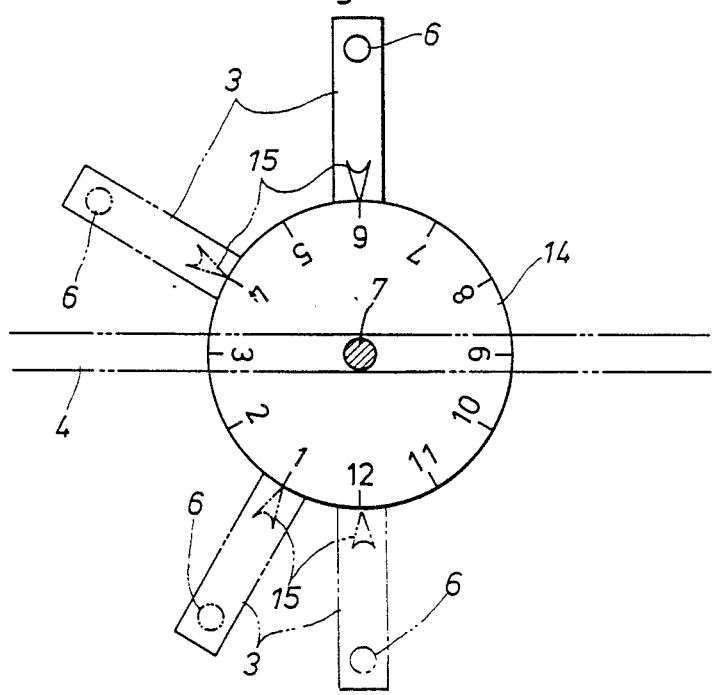

GLOBE HAVING MEANS FOR INDICATING A DAY AND NIGHT BOUNDARY

TECHNICAL FIELD

The present invention relates to a globe having means for indicating a day and night boundary, in particular to such a globe which can demonstrate how day and night regions on the earth change according to the time of the day and the month/season of the year.

BACKGROUND OF THE INVENTION

A conventional globe is suitable for demonstrating the oceans and continents on the earth in three-dimensions, but is not suitable for demonstrating the times of sunrise and sunset in various places on the earth in different times of the year.

Japanese patent laid open publication No. 60-100169 discloses an illumination device and a semi-spherical light shield both disposed in a semi-transparent hollow globe to demonstrate the regions of day and night on the earth. The light shield is rotatably supported around a vertical axial line and can be angularly adjusted with a knob which is detachably mounted on top of the globe.

This globe however requires a supply of electricity, and a complex structure must be incorporated in the interior of the globe. Therefore, its assembly process is highly complex, and the manufacturing cost is inevitably high.

BRIEF SUMMARY OF THE INVENTION

In view of such problems of the prior art, a primary object of the present invention is to provide a globe which is simple in structure and can demonstrate the regions of day and night on the earth not only in different times of the day but also in different times of the year.

A second object of the present invention is to provide a globe which can demonstrate the meridian altitude angle of the sun at any time of the year.

These and other objects of the present invention can be accomplished by providing: a globe, comprising: a stationary base; a day and night boundary ring mounted on the stationary base; an arm supported at its base end by the day and night boundary ring so as to be rotatable around a first axial line; and a spherical globe main body rotatably supported by a free end of the arm so as to be rotatable around its earth's axis; the first axial line defining an ecliptic angle with respect to a vertical line.

In this way, the distribution of the regions of day and night in any time of the day and in any time of the year can be readily demonstrated by means of the day and night boundary ring simply by turning the globe main body around the earth's axis and the first axial line, respectively.

According to a preferred embodiment of the present invention, a horizontal ring is fixedly supported by the base so as to coaxially surround the globe main body in a plane perpendicular to the day and night boundary ring and passing through the center of the globe main body. Alternatively, the day and night boundary ring may be rotatable within a plane of its major surface with respect the horizontal ring. To simply and clearly indicate the month and/or the season of the year in relation with the distribution of the regions of day and night, a month/season indicator may be provided on the arm between the base and free end.

If desired, the month/season indicator may be integral with the arm.

To show the meridian altitude of the sun at any time of the year, a meridian altitude indicator consisting of a band member may extend along a surface of the globe main body, and be pivoted at its one end to the base so as to be rotatable around an axial line perpendicular to the night and day boundary ring and passing through the center of the globe main body and provided, at its other end, with a longitudinal slot engaging with a pin which is coaxial with said earth's axis of said globe main body.

If the day and night boundary ring is mounted on the base by way of an intermediate member which is rotatable relative to the stationary base by an axial line defining half the ecliptic angle relative to a vertical line, the globe main body may be supported in either one of the two orientations, one with its earth's axis directed vertically, and the other with its earth's axis defining an ecliptic angle relative to the vertical line.

BRIEF DESCRIPTION OF THE DRAWINGS

Now the present invention is described in the following with reference to the appended drawings, in which:

FIG. 2 is a front view of the first embodiment;

FIG. 3 is an enlarged plan view of the month/season indicator used in the first embodiment;

DETAILED DESCRIPTION OF THE PREFERRED EMBODIMENTS

Figure 1:
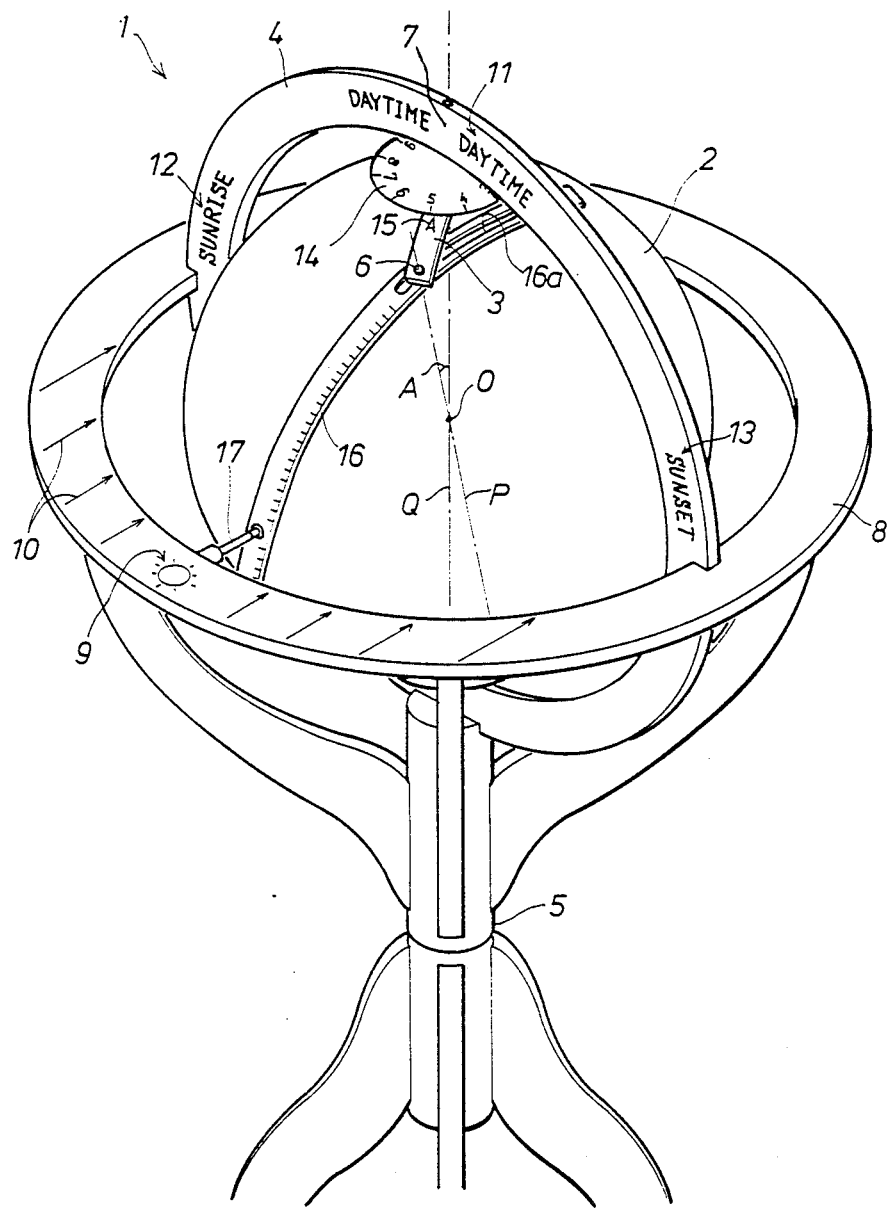
FIG. 1 is a perspective view of a first embodiment of the globe according to the present invention.

FIGS. 1 through 3 show a first embodiment of the globe according to the present invention. This globe 1 comprises a globe main body 2, and a base 5 supporting the globe main body 2 by way of a pair of arms 3 consisting of moveable supports for the globe main body 2 and a night and day boundary ring 4. The globe main body 2 is supported by free ends of the arms 3 at their opposite poles by way of a pair of pivot portions 6 so as to be rotatable around its earth's axis P. The based ends of the arms 3 are supported by pivot portions 7 provided at upper and lower ends of the night and day boundary ring 4 so as to be rotatably around an axial line Q which intersects with the earth's axis P at the center of the globe main body 2 defining a certain angle A, for instance 23.44 degrees or the ecliptic angle, relative to the earth's axis P. The upper end of the base 5 is formed as a horizontal ring 8 which is engaged with the night and day boundary ring 4 at their middle parts in a mutually perpendicular relationship. The lower end of the night and day boundary ring 4 is engaged with a slot provided in a central part of the base 5. The night and day boundary ring 4 can slidingly rotate relative to the base 5 as well as the horizontal ring 8, in a plane containing its major surface.

Alternatively, the day and night boundary ring 4 may be integrally attached to the horizontal ring 8 and the base 5.

The upper surface of the horizontal ring 8 on one side of the night and day boundary ring 4 is provided with a central indicator 9 for indicating that the position of the sun, and arrows 10 one either side of the indicator 9 to show the direction and magnitude of the solar radiation. The upper end of the night and day boundary ring 4 is centrally provided, on one side thereof, with an indicator 11 indicating the part of the earth on this side of the night and day boundary ring 4 is daytime, and the parts on the same side of the night and day boundary ring 4 adjacent the horizontal ring 8 are provided with marks 12 and 13 indicating that the sun is rising and setting in the associated regions of the earth, respectively.

Referring to FIG. 3, a month/season indicator disk 14 is fixedly secured to the night and day boundary ring 4 so as to surround the upper pivot portion 7. The month/season indicator disk 14 carries numerals 1 through 12 and/or four seasons along its outer circumference at equal interval to indicate the twelve months and/or the four seasons of the year. The upper end of the upper arm 3 is provided with an arrow 15 to point at one of the twelve numbers or the four seasons.

Referring to FIG. 1, an arcuate meridian elevation indicator band 16 extending along the surface of the globe main body 2 is pivotally supported at its middle part by a part of the horizontal ring 8 adjacent the sun indicator 9 by way of a pivot shaft 17 extending perpendicularly to the major surface of the night and day boundary ring 4. The upper and lower end portions of this meridian elevation indicator band 16 are each provided with a slot 16a receiving the pivot shaft of the pivot portion 6 in such a manner that the meridian elevation indicator band 16 can rotate over a certain angle around the pivot portion 17 following the rotational movement of the arms 3, with its slots 16a guided by the pivoted portions 6. In other words, the meridian elevation indicator band 16 is always located on the equinox of the globe main body 2 as it pivotally moves around the pivot shaft 17 along the surface of the globe main body 2.

Now the operation of this embodiment is described in the following. First of all, the solid lines in FIG. 2 show the relationship between the earth and the sun at summer solstice. The side of the day and night boundary ring 4 closer to the sun indicator 9 or to the left in FIG. 2 represents daytime, and the other side of the day and night boundary ring 4 represents night. The arrow 15 on the arm 3 points substantially at number 6. When the globe main body 2 is turned around its earth's axis P, it can be seen that the region near the upper pivot portion 6 or the north pole always stays in the daytime zone.

When the arm 3 is turned around the axial line Q as shown by the imaginary lines in FIG. 2 until the arrow 15 points at number 12 on the month/season indicator disk 14, the relationship between the earth and the sun at winter solstice is produced. Then, it can be seen that the region near the north pole is now located to the right in FIG. 2 and always stays in the night zone.

In this way, according to the globe of the present invention, the state of day and night in any geographical point on the earth as well as its seasonal changes can be instinctively and simply understood.

The elevation of the sun when it crosses the meridian can be known by turning the globe main body 2 around its earth's axis P to bring the particular region upon the meridian elevation indicator band 16 and reading the angle marked on the meridian elevation indicator band 16. If desired, at least one of the day and night boundary ring 4, the horizontal ring 8 and the meridian elevation indicator band 16 may be made from a transparent material to avoid obstructing the view of the globe main body 2.

Figure 4:
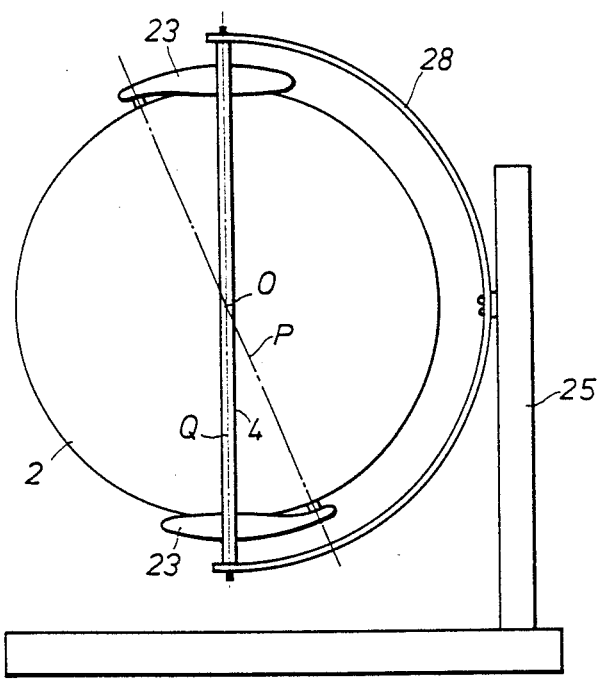
FIG. 4 is a side view of a second embodiment of the globe according to the present invention.
Figure 5:
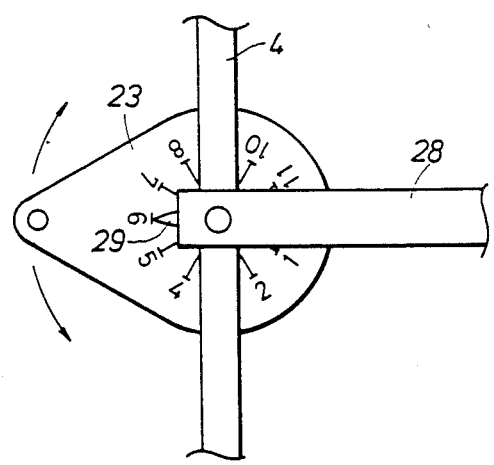
FIG. 5 is an enlarged plan view of the month/season indicator used in the second embodiment.

FIGS. 4 and 5 show a second embodiment of the present invention, and like parts are denoted with like numerals. According to this embodiment, the month/season indicator disk is integral with one of a pair of moveable support arms 23 pivotally supporting the globe main body 2, and the base ends of the moveable support arms 23 are pivotally supported by upper and lower ends of a C-shaped stay 28 which is in turn fixedly supported by a fixed base 25. A day and night boundary ring 4 is also fixedly attached to the upper and lower ends of the C-shaped stay 28. The upper end of the stay 28 is further provided with a pointer 29 for pointing at one of the numerals indicating the months and/or the seasons of the year. Otherwise, the present embodiment is similar to the previous embodiment.

Figure 6:
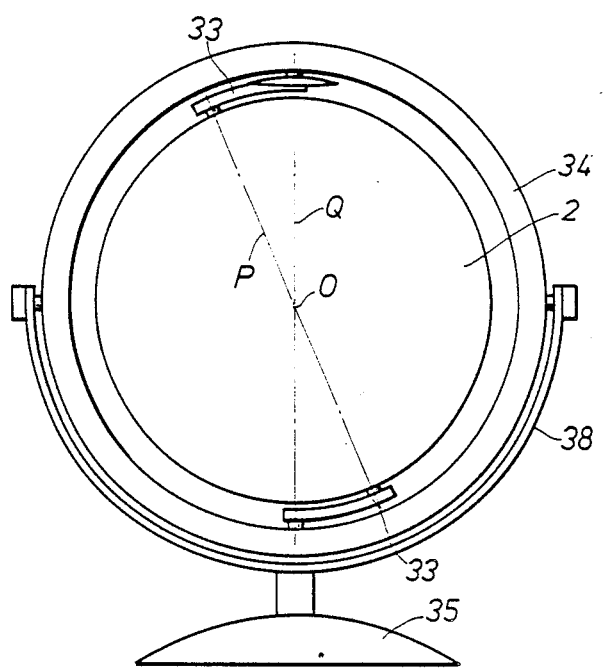
FIGS. 6 and 7 are side views of third and fourth embodiments of the globe according to the present invention.

FIG. 6 shows a third embodiment of the present invention. According to this embodiment, a day and night boundary ring 34 is pivotally supported by the free ends of a U-shaped stay 38 which is centrally and fixedly supported by a base 35. The globe main body 2 is supported only by the day and night boundary ring 34 by way of a pair of moveable support arms 33. This embodiment is otherwise similar to the second embodiment.

Figure 7:
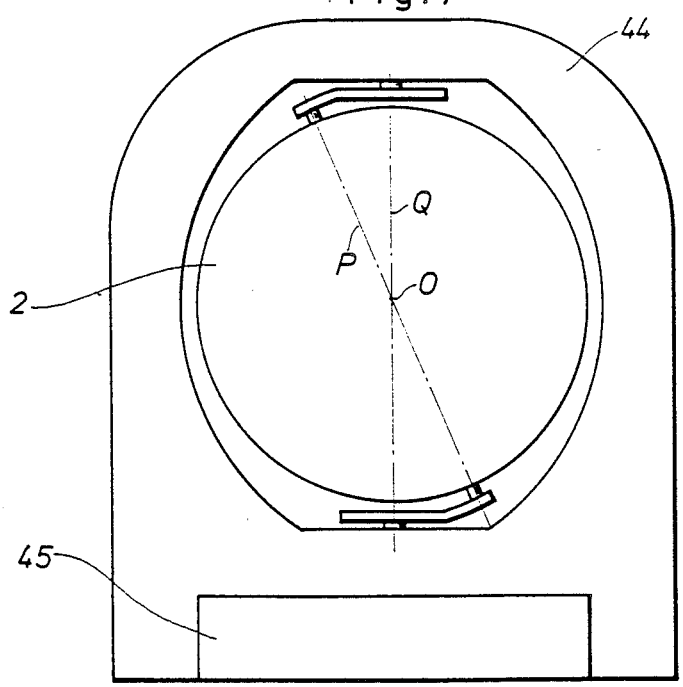

FIG. 7 shows a fourth embodiment of the present invention. According to the present invention, the day and night boundary ring 44 consists of a transparent planar member provided with a circular opening for receiving a globe main body 2 therein, and is directly and securely attached to a base 45. This embodiment is otherwise similar to the third embodiment.

Figure 8:
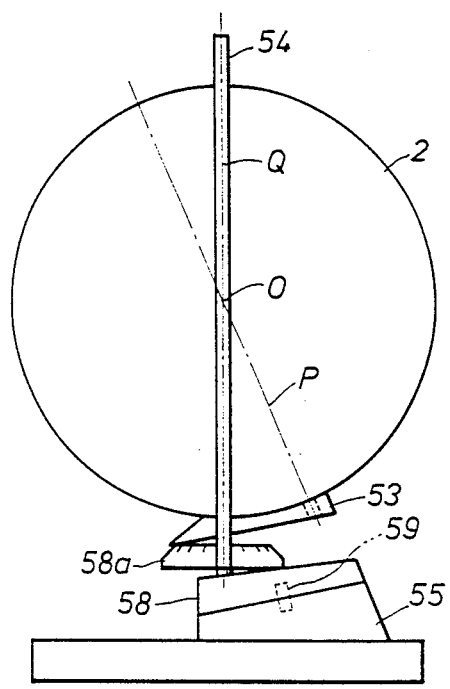
FIGS. 8 and 9 are side views showing a fifth embodiment of the globe according to the present invention in two different states in which it can be used.
Figure 9:
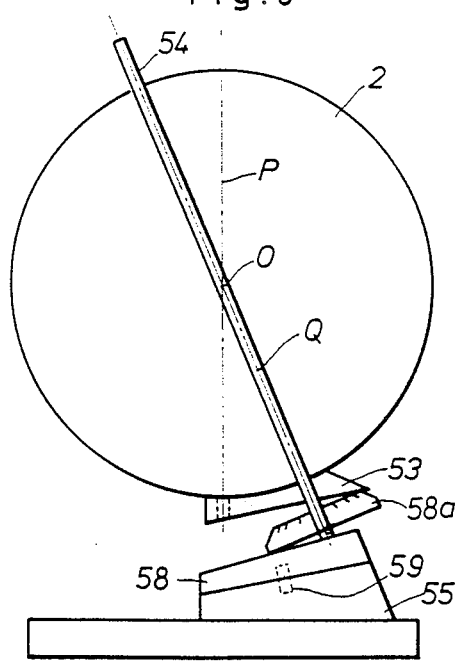

FIGS. 8 and 9 show a fifth embodiment of the present invention. According to this embodiment, a rotatable support member 58 is supported by a base 55 by means of a pivot shaft 59 which is inclined by 11.72 degrees or half the ecliptic angle with respect to a vertical line. A month/season indicator ring 58a is integrally secured to the support member 58, and a base end of support arm 53 is pivotally supported by the support member 58 coaxially and around a vertical line Q, as seen in FIG. 8, which lies in the same plane as a day and night boundary ring 54 (which is described hereinafter). The globe main body 2 is rotatably supported at its south pole by a free end of the support arm 53 around the earth's axis P. The rotatably support member 58 further integrally supports the day and night boundary ring 54.

Thus, the globe main body 2 is supported in such a manner that the plane of the major surface of the day and night boundary ring 54 is perpendicular to a horizontal plane in the normal way of supporting a globe as shown in FIG. 8, but, by turning the rotatable support member 58 by 180 degrees around the pivot shaft 59 with respect to the base 55, the globe main body 2 may be supported in such a manner that the earth's axis P coincides with a vertical line as shown in FIG. 9. According to this embodiment, the globe main body 2 is supported only at its south pole end, and the appearance of the globe may be improved.

Figure 10:
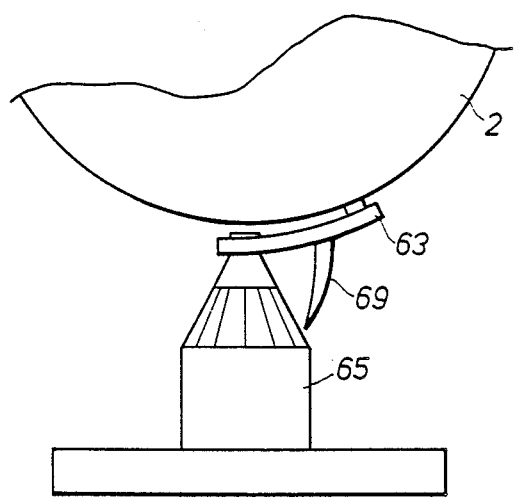
FIGS. 10 and 11 show two different alternate embodiments of the month/season indicator according to the present invention.
Figure 11:
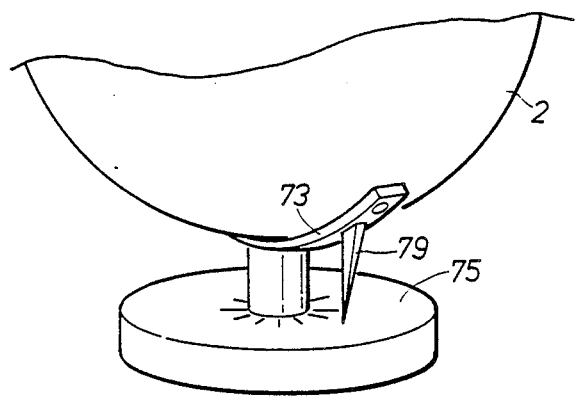

According to the embodiments illustrated in FIGS. 10 and 11, the seasons and/or the months of the year are marked on support bases 65 and 75 and moveable support arms 63 and 73 are provided with pointers 69 and 79, respectively, for indicating the season or the month associated with each different state of the globe main body 2. These embodiments are otherwise provided with similar structures to that of the fifth embodiment.

Although the present invention has been shown and described with respect to detailed embodiments, it should be understood by those skilled in the art that various changes and omission in form and detail may be made therein without departing from the spirit or scope of this invention.

What we claim is:

1. A globe, comprising:
    a stationary base;
    a day and night boundary ring mounted on said stationary base and extending in a vertical plane;
    an arm supported at its base end by said day and night boundary ring so as to be rotatable around a first axis;
    a spherical globe main body rotatably supported by a free end of said arm so as to be rotatable around its earth's axis;
    said first axis defining an ecliptic angle with respect to a vertical line; and
    a horizontal ring supported by said base so as to coaxially surround said globe main body in a plane perpendicular to said day and night boundary ring and passing through the center of said globe main body, said day and night boundary ring being rotatable within a plane of its major surface with respect to the horizontal ring.

2. A globe according to claim 1, wherein said horizontal ring is fixedly supported by said base.

3. A globe according to claim 1, further comprising a month/season indicator which is disposed on said arm between said base and free end to indicate a month and/or season according to a relative angle between said base and said arm.

4. A globe according to claim 3, wherein said month/season indicator is integral with said arm.

5. A globe according to claim 1, further comprising a meridian altitude indicator consisting of a band member extending along a surface of said globe member, and pivoted at its one end to said base so as to be rotatable around an axial line perpendicular to said night and day boundary ring and passing through the center of said globe main body and provided, at its other end, with a longitudinal slot engaging with a pin which is coaxial with said earth's axis of said globe main body.

6. A globe according to claim 1, wherein said day and night boundary ring is mounted on said base by way of a intermediate member which is rotatable relative to said stationary base by an axial line defining half the ecliptic angle relative to a vertical line.

* * * * *